United States Patent
Iwamura et al.

(10) Patent No.: US 6,721,438 B1
(45) Date of Patent: Apr. 13, 2004

(54) IMAGE PROCESSING APPARATUS, IMAGE PROCESSING METHOD, AND STORAGE MEDIUM

(75) Inventors: Keiichi Iwamura, Yokohama (JP); Takeshi Makita, Kawasaki (JP); Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/536,457

(22) Filed: Mar. 28, 2000

(30) Foreign Application Priority Data

Mar. 30, 1999 (JP) .......................... 11-089702

(51) Int. Cl.⁷ .............................................. G06K 9/00
(52) U.S. Cl. ...................................................... 382/100
(58) Field of Search ................................. 382/100, 232; 380/203, 210, 241; 713/176, 178, 179; 348/460, 211.5, 211.6; 725/21

(56) References Cited

U.S. PATENT DOCUMENTS

| | | | |
|---|---|---|---|
| 5,561,534 A | 10/1996 | Ishida et al. | 358/448 |
| 5,600,720 A | 2/1997 | Iwamura et al. | 380/1 |
| 5,636,292 A | 6/1997 | Rhoads | 382/232 |
| 5,659,726 A * | 8/1997 | Sandford, II et al. | 707/101 |
| 5,666,419 A | 9/1997 | Yamamoto et al. | 380/28 |
| 5,694,486 A | 12/1997 | Shigeeda et al. | 382/197 |
| 5,748,777 A | 5/1998 | Katayama et al. | 382/199 |
| 5,757,961 A | 5/1998 | Yamakawa et al. | 382/197 |
| 5,828,794 A | 10/1998 | Katayama et al. | 382/298 |
| 5,905,819 A * | 5/1999 | Daly | 382/284 |
| 5,930,369 A * | 7/1999 | Cox et al. | 380/54 |
| 5,933,528 A | 8/1999 | Katayama et al. | 382/197 |
| 5,937,395 A | 8/1999 | Iwamura | 705/30 |
| 6,243,480 B1 * | 6/2001 | Zhao et al. | 382/100 |
| 6,268,866 B1 * | 7/2001 | Shibata | 358/3.28 |
| 6,332,030 B1 * | 12/2001 | Manjunath et al. | 382/100 |
| 6,449,377 B1 * | 9/2002 | Rhoads | 382/100 |

FOREIGN PATENT DOCUMENTS

| | | | |
|---|---|---|---|
| EP | 0 529 746 | 3/1993 | G03G/15/00 |
| EP | 0 529 746 A2 | 3/1993 | G03G/15/00 |
| EP | 0 859 337 A2 | 8/1998 | G06T/11/00 |

OTHER PUBLICATIONS

"Digital Watermark Technique Based on the Wavelet Transform and its Robustness on Image Compression and Transformation", H. Inoue, et al., The 1998 Symposium on Cryptography and Information Security (SCIS'98), The Institute of Electronics, Information and Communication Engineers, Hamanako, Japan, pp. 1–7, Jan. 28–31, 1998.

"A Method of Watermarking Under Frequency Domain for Protecting Copyright of Digital Image", Takao Nakamura, et al., 1997 Symposium on Cryptography and Information Security, Institute of Electronics, Information and Communication Engineers, SC1S'97–26A, Jan. 29–Feb. 1, 1997, Fukuoka, Japan.

"Storage and Retrieval for Image and Video Databases III", W. Niblack, et al., SPIE Proceedings Series, vol. 2420, pp 164–173, Feb. 9–10, 1995, San Jose, California.

(List continued on next page.)

*Primary Examiner*—Andrew W. Johns
*Assistant Examiner*—Shervin Nakhjavan
(74) *Attorney, Agent, or Firm*—Fitzpatrick, Cella, Harper & Scinto (57) ABSTRACT

A deterrent effect for a forgery of an image can be provided and both of the protection of a picture quality of an image of a relatively low similarity and the prevention of a forgery of an image of a relatively high similarity can be realized. For this purpose, an image processing apparatus has embedding processing means for embedding predetermined information which can specify an output apparatus and an output date/time as a digital watermark having a resistance according to a similarity with a specific image 106 into an output image, thereby enabling the deterrent of a forgery of the specific image 106 according to the similarity to be realized while outputting an image which the operator intends to output.

6 Claims, 4 Drawing Sheets

OTHER PUBLICATIONS

"A Watermarking Scheme to Image Data by PN Sequence", J. Ohnishi, et al., IEICE, SCIS'97–26B, pp. 1–8, Jan. 29–Feb. 1, 1997, Japan.

"On An Experimental Evaluation of Steganography With Wavelet Transform", H. Ishizuka, et al., IEICE, SCIS'97–26D, pp. 1–10, Jan. 29–Feb. 1, 1997, Japan.

* cited by examiner

IMAGE PROCESSING APPARATUS, IMAGE PROCESSING METHOD, AND STORAGE MEDIUM

BACKGROUND OF THE INVENTION

1. Field of the Invention

The invention relates to an image processing apparatus, an image processing method, and a storage medium.

2. Related Background Art

Hitherto, an image processing apparatus reads an image on an original put on a copyboard glass or the like and accurately performs a recording operation in accordance with a printed matter, an electronic storage medium, or the like in response to an instruction of the operator.

According to a recent image processing technique, image information whose output has been instructed can be accurately reconstructed on a printed matter owing to progress of a coloring technique. In a conventional apparatus, therefore, matters such as bills, securities, or the like whose forgery is prohibited or copyrighted works such as pictures or the like can be copied and printed by abusing the image processing technique or by "out of mischief" or the like.

To solve such a problem, in EP 0529746 B1, there has been proposed an image processing apparatus comprising: input means for inputting image information; evaluating means for evaluating, at multistages, a similarity between an image which is expressed by the image information and a specific image whose accurate reproduction is inhibited; and processing means for transforming the image information inputted at a degree according to the multistage evaluation by the evaluating means.

It is an object of the apparatus to disable the use of an output image of an image determined in a manner such that it has a similarity with a specific image. For this purpose, a transforming process such as color transformation, tilted type transformation, enlargement, reduction, or the like by which an image can be discriminated by the human being is executed in accordance with the similarity.

According to this apparatus, however, since the transforming process by which the image can be discriminated by the human being is executed even if the similarity with the specific image is relatively low, the transforming process is executed and a resultant image is outputted with respect to another image which has a similarity with respect to only a part of a specific image or portions at a few discrete positions thereof and in which it is possible to easily determine in a manner such that they are different from the specific image if they are seen by the human being.

SUMMARY OF THE INVENTION

In consideration of the above problems, it is an object of the invention to make it possible to have a deterrent effect again a forgery of an image.

Another object of the invention is to make it possible to meet both a protection of a picture quality of an image of a relatively low similarity and a prevention of a forgery of an image of a relatively high similarity.

Still another object of the invention is to provide a new function.

The above and other objects and features of the present invention will become apparent from the following detailed description and the appended claims with reference to the accompanying drawings.

DETAILED DESCRIPTION OF THE PREFERRED EMBODIMENTS

[First Embodiment]

In recent years, a technique called a digital watermark for protection of a copyright of digital information has been known. Generally, the digital watermark technique is a technique for embedding copyright information, user information, various identification numbers, or the like by secretly transforming a pixel value or the like of digital image data.

By extracting the digital watermark from data, the copyright information, user information, various identification information, or the like can be obtained and an illegal copy can be pursued.

The first condition which is required in the digital watermark is that embedded information cannot be perceived, namely, it can be embedded with a little deterioration of a quality of the original digital information (Quality).

The second condition is that the embedded information continuously remains in the digital information, namely, the embedded information is not lost even by an edition or attack such as data compression or filtering process (Resistance).

Further, the third condition is that an amount of information to be embedded can be selected in accordance with a use purpose (Information amount).

Figure 1:
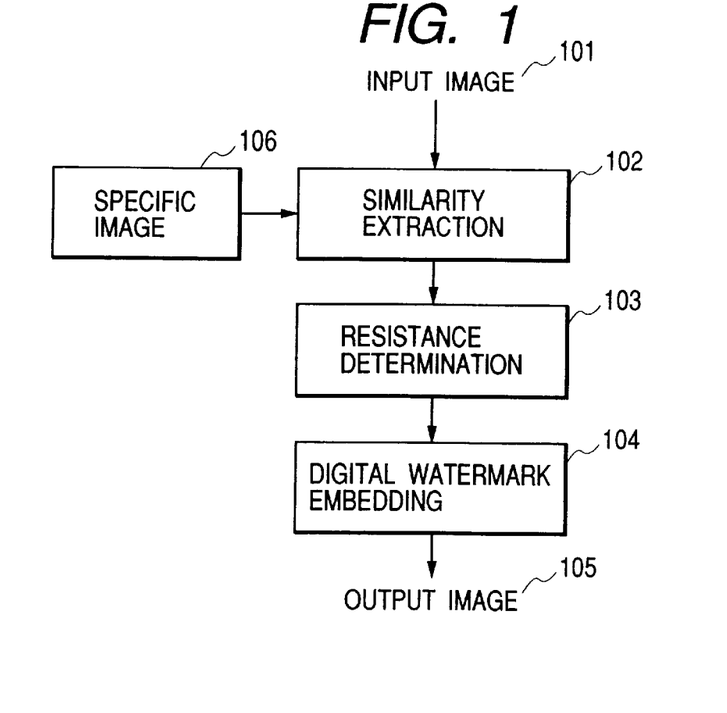
FIG. 1 is a diagram for explaining an outline of processes in the first embodiment of the invention.

FIG. 1 shows a schematic diagram for explaining the first embodiment of the invention.

Figure 5:
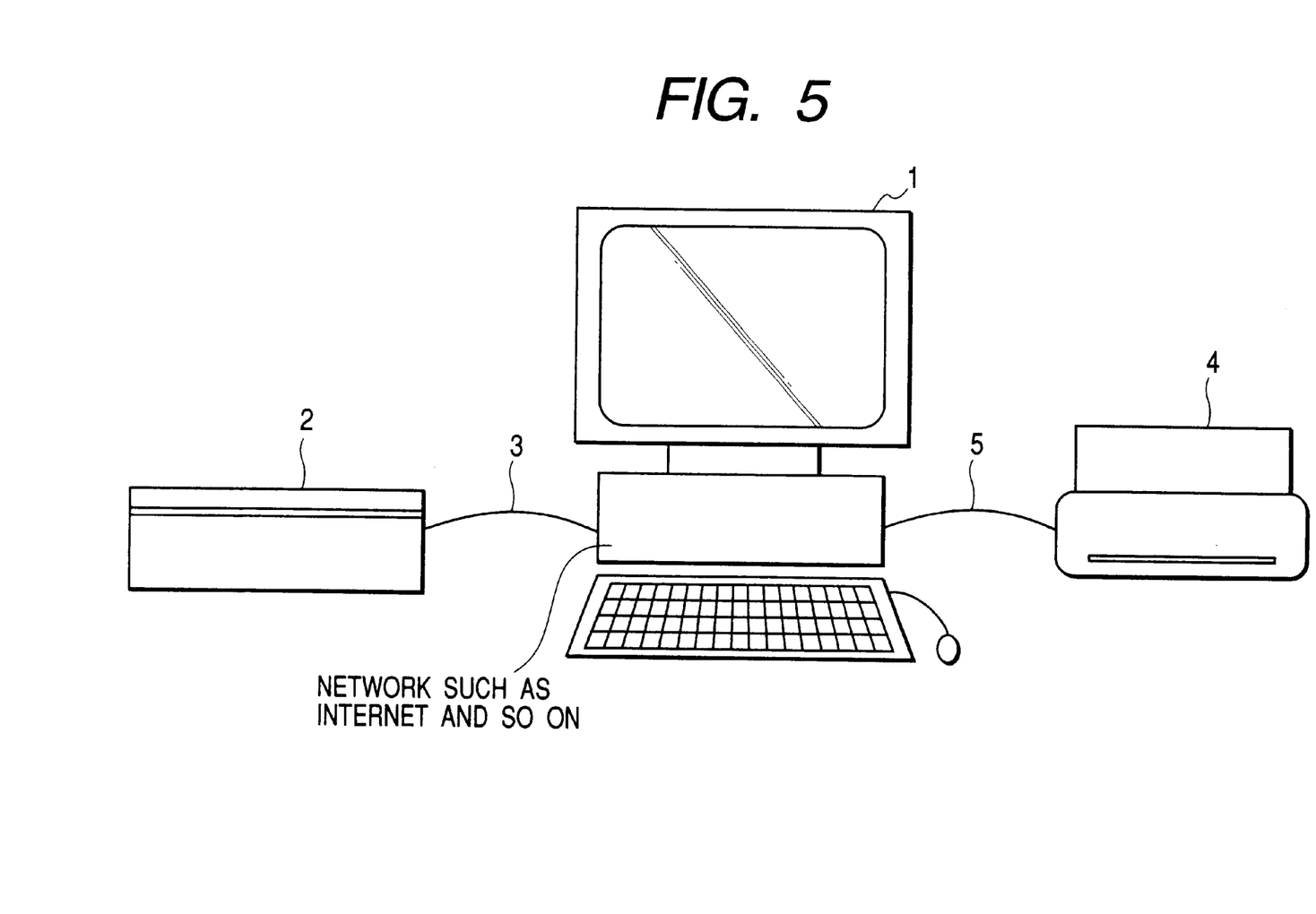
FIG. 5 is a diagram showing a construction of an image processing system.

FIG. 5 is a diagram showing an image processing system which is common to all of the embodiment 1 and subsequent embodiments, which will be explained hereinlater.

Reference numeral 1 denotes a host computer for executing processes in a range from an extraction of a similarity and a digital watermark to an embedding of a digital watermark and a modification of an image in each embodiment, which will be explained hereinlater. Those processes are realized by a scanner driver and a printer driver installed in the host computer 1.

Reference numeral 2 denotes a scanner for inputting an input image and 4 indicates a printer for outputting an output image. Although the scanner is used to input an input image in FIG. 5, an image from a digital camera or an image obtained by a film scanner by reading an image photographed by a silver salt camera can be also used as an input image.

Reference numerals 3 and 5 denote communication lines for inputting the input image from the scanner to the host computer or outputting the output image obtained after the image was processed by the host computer.

Although a wired communication line is used in FIG. 5, a radio interface such as a Bluetooth interface or the like can be also used.

As shown in FIG. 1, an input image 101 which the operator intends to output is supplied to a similarity extraction unit 102, by which a similarity with a specific image 106 is first extracted.

As shown as a bills.securities similar feature extracting circuit in the foregoing EP 0529746 B1, the similarity extraction unit 102 can be realized by a circuit or method for comparing a color spectrum distribution of an image or a part of or the whole image pattern, or the like. It can be also realized by a circuit or method for identifying a size, a watermark pattern, a magnetic pattern, or the like of an image, or the like.

A resistance of the digital watermark is subsequently determined by a resistance determination unit 103 on the basis of the similarity extracted from the similarity extraction unit 102. The resistance changes due to parameters for deciding the resistance, which will be explained hereinlater, in the case where a digital watermark method that is used is fixed. In the case where the digital watermark method that is used can be selected, the resistance changes by selecting a method while the parameters for deciding the resistance are also included.

The correspondence between the similarity outputted from the similarity extraction unit 102 and the method or resistance of the digital watermark can be realized by previously storing the correspondence into a table, or the like.

The embedding of digital watermark information according to the digital watermark method and the resistance parameters which are outputted from the resistance determination unit 103 is performed by a digital watermark embedding unit 104. A process in which a digital watermark having a strong resistance is embedded in accordance with the similarity denotes a process in which a digital watermark in which the higher the similarity of an output image is, the more it is difficult to be modified (the more it is difficult to be lost due to an edition or attack) is embedded. Although various methods of embedding a digital watermark according to an intensity of the resistance are considered, for example, the following method is considered.

First, the following method has been known as a digital watermark method. That is, when a multivalue still image is taken as an example, the digital watermark embedding method can be largely classified into the following two methods: a method of embedding a digital watermark into a space region; and a method of embedding it into a frequency region. The following various methods have been known.

Among examples of the method of embedding a digital watermark into the space region, as methods by a patchwork, the following methods can be mentioned: a method of IBM Ltd. (W. Bender, D. Gruhl, and N. Morimoto, "Techniques for Data Hiding", Proceedings of the SPIE, San Jose Calif., U.S.A., February, 1995); a method of G. B. Rhoads and W. Linn, "Steganography methods employing embedded", U.S. Pat. No. 5,636,292; and the like.

Among examples of the method of embedding a digital watermark into the frequency region, as a method using the discrete cosine transformation, besides a method of NTT Corp. (Nakamura, Ogawa, and Takashima, "Digital watermark system in frequency region for protection of copyright of digital image", SCIS' 97—26A, January, 1997) can be mentioned, and as a method using the discrete fourier transformation, a method of National Defense Academy (Ohnishi, Oka, and Matsui, "Watermark signature method to image by PN series", SCIS' 9726B, January, 1997) can be mentioned.

Further, as methods using the discrete wavelet transformation, the following methods can be mentioned: a method of Mitsubishi Electric Corp. and Kyushu University (Ishizuka, Sakai, and Sakurai, "Experimental examination regarding safety and reliability of digital watermark technique using wavelet transformation", SCIS' 97—26D, January, 1997); a method of Matsushita Electric Industrial Co., Ltd. (Inoue, Miyazaki, Yamamoto, and Katsura, "About robust performance for digital watermark—image compressing and transforming processes based on wavelet transformation", SCIS' 98— 3.2.A, January, 1998); and the like.

In the method of embedding a digital watermark into the space region, it is generally known that although a quality deterioration is small, a resistance is weak. In the method of using the frequency transformation, it is generally known that although a quality deterioration is relatively large, a resistance is strong. A desired method can be used as necessary. Also for one digital watermark method, the resistance can be selected as follows.

Assuming that input data as copyrighted works is a still image, image data of the still image is divided into blocks each comprising (8×8) pixels and a DCT (Discrete Cosine Transform) is performed every block. Hereinafter, the DCT transformed block is called a DCT coefficient block, one coefficient of the DCT coefficient block is called a DCT coefficient, and a set of DCT coefficient blocks of one image is called a DCT coefficient block group.

Figure 2A:
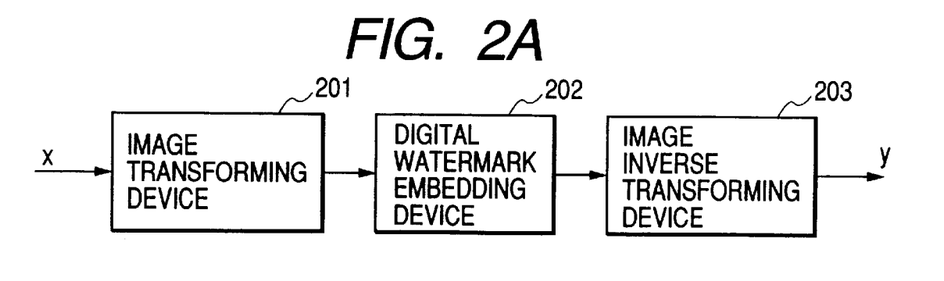
FIGS. 2A and 2B are schematic diagrams for explaining an embedding and an extraction of a digital watermark.

As shown in FIG. 2A, therefore, an input image x is DCT transformed by an image transforming device 201 and a DCT coefficient block group as its output is used as an input of a digital watermark embedding device 202.

In the DCT coefficient block group, one DCT coefficient block to be embedded is selected and one DCT coefficient in the selected DCT coefficient block is quantized, thereby embedding an embedding bit of one bit.

At this time, a size of quantization step and a position of the selected DCT coefficient are stored as key information. For example, a value of the DCT coefficient locating at a position of coordinates (u, v) is expressed by s{u, v}, the quantization step is labelled to h, and "0" or "1" as a digital watermark bit is embedded by the following rules.

In the following equation (1), a value of (a) is obtained.

$$a \cdot h < s\{u, v\} \leq (a+1) \cdot h \tag{1}$$

When the embedding bit=0, the following operation is performed.

$$c\{u, v\} = b \cdot h + h/2 \tag{2}$$

(b is one (even number) of "a" and "a+1")

When the embedding bit=1, the following operation is performed.

$$c\{u, v\} = b \cdot h + h/2 \tag{3}$$

(b is one (odd number) of "a" and "a+1")

c{u, v} is a coefficient after the embedding. The values of the coordinates (u, v) and quantization step h become the key information here. Finally, the block group is IDCT (Inverse DCT) transformed by using an image inverse transforming device 203, thereby returning it to the blocks each comprising (8×8) pixels and reconstructing them.

Figure 2B:
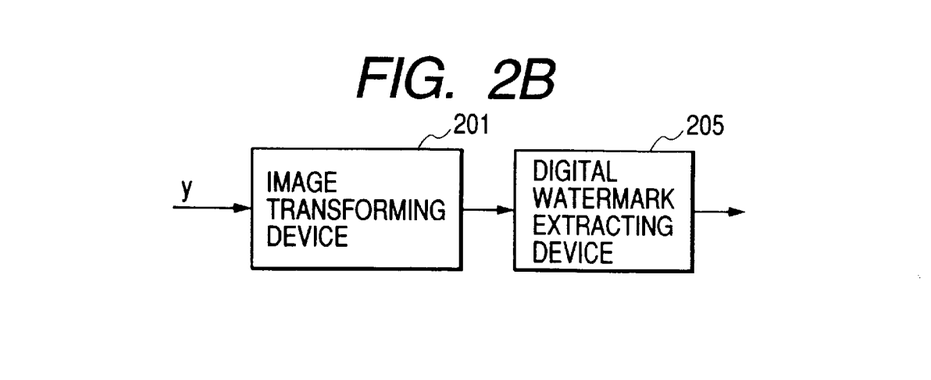

As for the extraction of the embedding bit, as shown in FIG. 2B, in the DCT coefficient block group subjected to a similar DCT by the image transforming device 201, the position of the embedded DCT coefficient and the value of h are obtained by using the stored key information by a digital watermark extracting device 205. In the following equation (4), a value of "b" is obtained.

$$b \cdot h < c\{u, v\} \leq (b+1) \cdot h \qquad (4)$$

If "b" is an even number, the embedding bit is determined as "0". If it is an odd number, the embedding bit is decided as "1".

In this embedding method, the following methods of selecting the resistance are considered. When one DCT coefficient to be embedded is selected from the DCT coefficient block, if a DCT coefficient showing a low frequency component is selected, the resistance can be enhanced. This is because there is a such nature that although a high frequency component is easily lost by the image compression, various filtering processes, or the like, the low frequency component is difficult to be lost.

The resistance can be also enhanced by increasing the value of the quantization step h. This is because the larger the quantization step h is, the more the operation amounts in the equations (2) and (3) increase, and it becomes difficult to be changed to another value by various modifying processes.

Although the case where the number of DCT coefficient blocks to be selected and the number of DCT coefficients to be embedded have been set to 1 has been described in the foregoing embedding method, the resistance can be also enhanced by increasing the numbers of them. This is because if one bit was merely embedded into one DCT coefficient, a possibility that its value is lost by various modifying processes is large, however, if the same bit is embedded in a plurality of DCT coefficients, a possibility that most of them are lost is small.

The resistance can be also enhanced by error correction encoding the bits themselves to be embedded. This is because even if some of the embedding bits were lost, they are reconstructed by an error correction code. It will be obviously understood here that the higher a correcting ability of the error correction code which is used is, the stronger the resistance is.

However, according to those methods, although the resistance is enhanced, there is a case where a low frequency component of an image is changed or a quality of an image slightly deteriorates because many bits are embedded. If the operation opposite to those mentioned above is performed, a digital watermark method of a high picture quality can be realized although the resistance is weakened.

The method of enhancing the resistance as mentioned above is not limited to the method using the DCT but has a similar tendency as for the method using the wavelet transformation or Fourier transformation or the method of embedding a digital watermark into the space region.

By selecting the foregoing digital watermark embedding method and the parameters such as frequency component, quantization step, the number of embedding digital watermarks, error correction code, and the like in accordance with the similarity from the resistance determination unit 103 as mentioned above, the digital the similarity is realized by the digital watermark embedding unit 104 and an output image 105 is outputted.

Identification information such as device number, product number, and the like of an output device and various information including an output date/time and the like are considered as digital watermark information which is embedded.

Although the embodiment has been described with respect to the digital watermark of a multivalue image as an example, the digital watermark which is used in the embodiment is not limited to the multivalue digital watermark but includes a digital watermark method of embedding a digital watermark into binary information.

[Second Embodiment]

Figure 3:
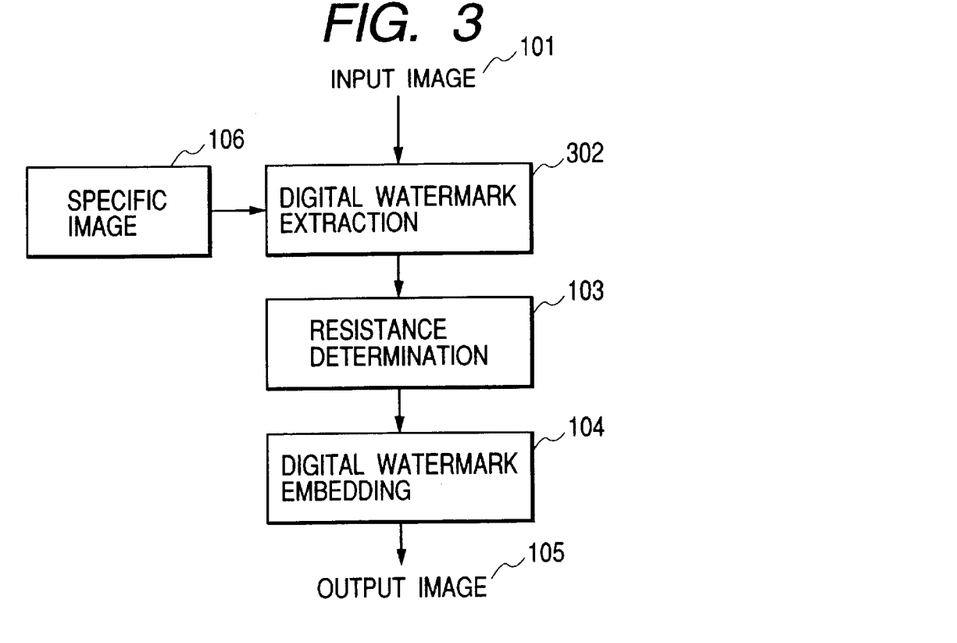
FIG. 3 is a diagram for explaining an outline of processes in the second embodiment.

FIG. 3 shows a schematic diagram for explaining the second embodiment of the invention. Particularly, the similarity extraction unit 102 is replaced with a digital watermark extraction unit 302. The second embodiment is made by presuming a case where digital watermark information which is difficult to be identified by the human eyes has previously been embedded in the specific image 106 such as bill, securities, or the like.

Such a presumption is a practical presumption because when a digital watermark technique is generally used as means for protection of the copyright or prevention of a forgery in future, it is well considered that specific information indicating that bills or securities relate to information whose copy or forgery is prohibited is embedded as digital watermark information into the bills or securities by a predetermined method.

Since the processes of the other portions are similar to those in the first embodiment, they are designated by the same reference numerals and their descriptions are omitted here and only the digital watermark extraction unit 302 will be described.

The digital watermark extraction unit 302 is an extracting device of a digital watermark embedding method which has been predetermined for the specific image 106. From the input image 101 which the operator intends to output, digital watermark information is first extracted by a predetermined procedure by the digital watermark extraction unit 302.

Subsequently, the extracted digital watermark information is compared with specific information indicating that it is the information whose copy or forgery is prohibited, and its similarity is outputted. This similarity can be calculated by a method of comparing bits of the digital watermark information with those of the specific information or the like. The calculated similarity is inputted to the digital watermark embedding unit 104 and processes (as the similarity is higher, a digital watermark of a stronger resistance is embedded) similar to those in the foregoing first embodiment are executed.

In the case where an image obtained by performing a modifying process to the specific image 106 for the purpose of forging the specific image 106 is used as an input image, the embedded digital watermark information is also modified. The similarity which is extracted by the digital watermark extraction unit 302 differs depending on the performed modifying process. However, if a modifying process by which the digital watermark information of the input image is largely lost is performed, since a picture quality also generally largely deteriorates, whether the forgery has been performed or not can be discriminated by the human eyes.

On the contrary, if a modifying process in which the deterioration of the picture quality is deterred is performed, the similarity of the digital watermark information extracted by the digital watermark extraction unit 302 rises and the digital watermark information of a strong resistance according thereto is embedded by the digital watermark embedding unit 104. Therefore, the forgery can be deterred also by this embodiment.

[Third Embodiment]

Figure 4:
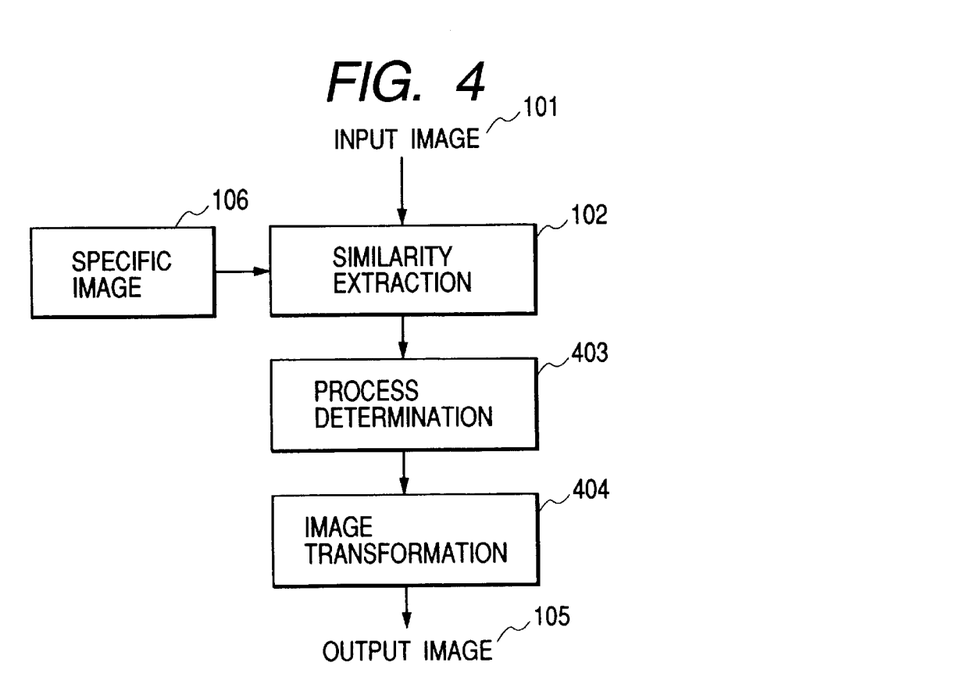
FIG. 4 is a diagram for explaining an outline of processes in the third embodiment.

FIG. 4 shows a schematic diagram for explaining the third embodiment of the invention. Although the first and second embodiments have been described with respect to the example of using the digital watermark which is difficult to be identified by the human eyes, the digital watermark can be also combined with a transforming process such as color transformation, tilted type transformation, enlargement, reduction, or the like by which the image can be identified by the human eyes as shown in the foregoing EP 0529746 B1.

That is, if the similarity which is outputted from the similarity extraction unit 102 is equal to or larger than a predetermined value, the transforming process by which the image can be identified by the human eyes is performed to the input image. If the similarity is less than the predetermined value, a digital watermark embedding process having a predetermined resistance in which the image is difficult to be identified by the human eyes is performed in an image transformation unit 404.

The transforming process and the resistance are determined by a process determination unit 403. Further, in the case where the similarity is high and the input image almost coincides with the specific image and the input image is presumed as a specific image 106 whose copy or forgery is prohibited, it is also possible to combine with an image transformation such as stop of the output, execution of a process for painting in black by which the resultant image cannot be used, or the like.

Such a correspondence of the processes can be realized by using a table in which it has previously been stored, or the like. In the embodiment, the similarity extraction unit 102 can be also replaced with the digital watermark extraction unit 302.

[Fourth Embodiment]

Figure 6:
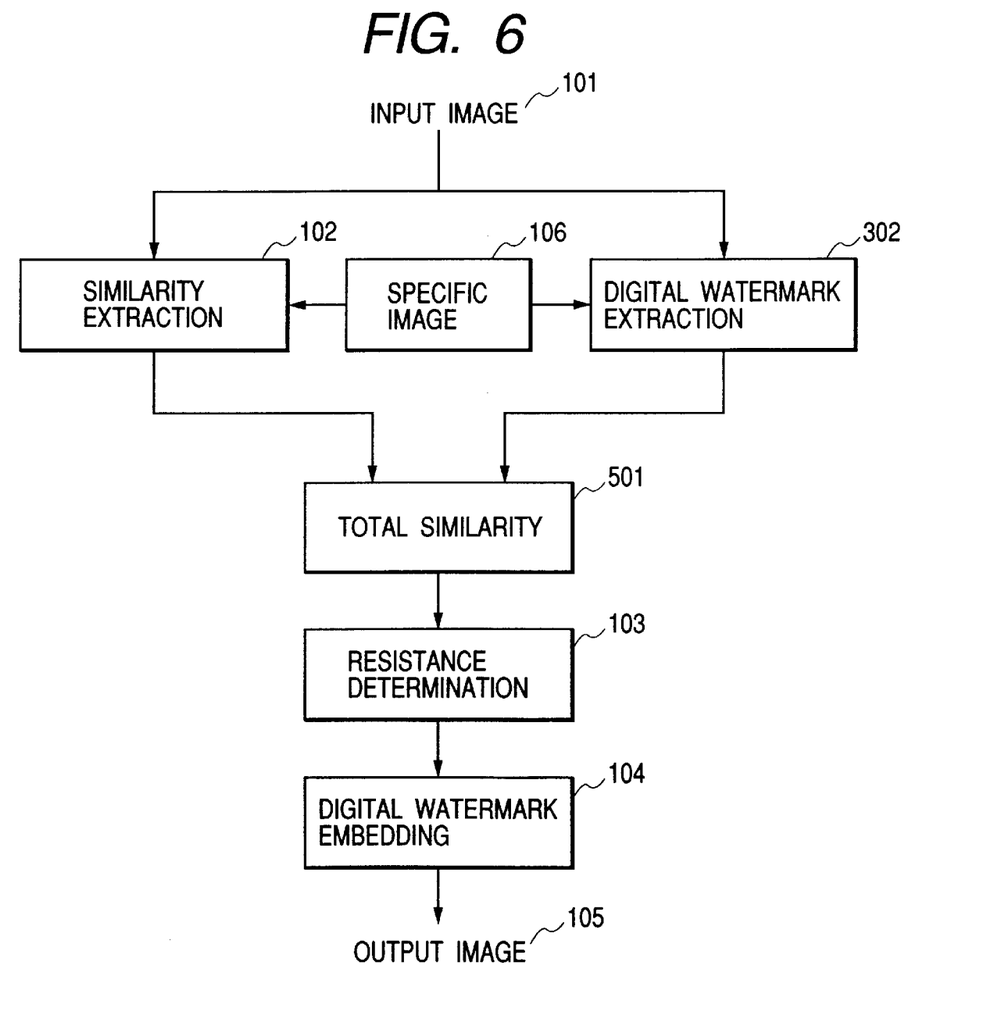
FIG. 6 is a diagram for explaining an outline of processes in the fourth embodiment.

In the embodiments 1 and 2, the color spectrum distribution of the image, image pattern, size, or the like is extracted (embodiment 1) or the digital watermark is extracted (embodiment 2) and the similarity between the input image and the specific image is calculated. However, it is also possible to perform the extraction of the similarity in the embodiment 1 and the extraction of the digital watermark in the embodiment 2 in parallel and obtain the total similarity by using results which are extracted, respectively (FIG. 6).

Thus, even if the input image is processed to obstruct either the similarity extraction 102 in the embodiment 1 or the digital watermark extraction 302 in the embodiment 2, the feature of the specific image which is not obstructed can be extracted by either the similarity extraction 102 or digital watermark extraction 302.

Even in case of the bills, for example, a case where a digital watermark is embedded in bills of a certain country and no digital watermark is embedded in bills of another country is also considered. However, it is possible to cope with bills and securities of various countries by having both of the similarity extraction 102 and digital watermark extraction 302.

[Other Embodiments]

The invention is not limited only to the apparatuses and methods for realizing the above embodiments and the method by a combination of the methods described in the embodiments but the invention also incorporates a case where program codes of software to realize the foregoing embodiments are supplied to a computer (a CPU or an MPU) in the system or apparatus and the computer of the system or apparatus makes each of the various devices in accordance with the program codes, thereby realizing the embodiments.

In this case, the program codes themselves of the software realize the functions of the embodiments and the program codes themselves and means for supplying the program codes to the computer, specifically speaking, a storage medium in which the program codes have been stored is also incorporated in the invention.

As a storage medium for storing such program codes, for example, a floppy disk, a hard disk, an optical disk, a magnetooptic disk, a CD-ROM, a magnetic tape, a nonvolatile memory card, an ROM, or the like can be used.

The program codes are also incorporated in the invention not only in the case where the computer controls various devices in accordance only with the supplied program codes, so that the functions of the embodiments are realized but also in the case where the program codes cooperate with the OS (Operating System) which is operating on the computer, another application software, or the like and the embodiments are realized.

Further, the invention also incorporates a case where the supplied program codes are stored into a memory equipped for a function expanding board of a computer or a function expanding unit connected to the computer and, thereafter, a CPU or the like equipped for the function expanding board or function expanding unit executes a part or all of the actual processes on the basis of instructions of the program codes, and the embodiment is realized by those processes.

As described above, since the digital watermark having the resistance according to the similarity with the specific image such as bill, securities, or the like whose copy or forgery is prohibited is embedded, the deterrent of the forgery of the specific image according to the similarity can be realized while outputting the image which the operator intends to output.

Since the process can be selected in a manner such that the image having a relatively high similarity is subjected to the process by which the image can be identified by the human eyes and the image having a relatively low similarity is subjected to the process by which the image is difficult to be identified by the human eyes, both the prevention of the forgery of the specific image such as bill, securities, or the like whose copy or forgery is prohibited and the protection of the picture quality can be realized.

What is claimed is:

1. An image processing apparatus comprising:
   input means for inputting image information;
   discriminating means for discriminating a similarity between said image information and a specific image; and
   embedding means for embedding a digital watermark having higher resistance in proportion to an increase of said similarity, into said image information.

2. An apparatus according to claim 1, wherein said resistance changes due to said digital watermark embedding method or said resistance parameter.

3. An apparatus according to claim 1, wherein said digital watermark includes a watermark which is embedded into a space region and a watermark which is embedded into a frequency region.

4. An apparatus according to claim 1, wherein said specific image includes a bill or securities.

5. An image processing method comprising:
   an input step of inputting image information;
   a discriminating step of discriminating a similarity between said image information and a specific image; and
   an embedding step of embedding a digital watermark having higher resistance in proportion to an increase of said similarity, into said image information.

6. A computer-readable storage medium which stored an image processing program, wherein said program comprises:
   an input step of inputting image information;
   a discriminating step of discriminating a similarity between said image information and a specific image; and
   an embedding step of embedding a digital watermark having higher resistance in proportion to an increase of said similarity, into said image information.

* * * * *

UNITED STATES PATENT AND TRADEMARK OFFICE
CERTIFICATE OF CORRECTION

PATENT NO. : 6,721,438 B1
DATED : April 13, 2004
INVENTOR(S) : Iwamura et al.

It is certified that error appears in the above-identified patent and that said Letters Patent is hereby corrected as shown below:

Column 1,
Line 56, "again" should read -- against --.

Column 2,
Line 32, "a" (first occurrence) should be deleted.

Column 5,
Line 17, "be lost" should read -- lose. --; and
Line 56, "digital" should read -- digital watermark embedding having the resistance according to --.

Column 6,
Line 65, "the" (first occurrence) should be deleted.

Column 7,
Line 66, "magnetooptic" should read -- magneto-optic --.

Signed and Sealed this

Thirty-first Day of August, 2004

JON W. DUDAS
*Director of the United States Patent and Trademark Office*